W. R. HANKS.
Vapor-Burner.

No. 206,015. Patented July 16, 1878.

WITNESSES
INVENTOR
William R. Hanks
By his Att'ys.

UNITED STATES PATENT OFFICE.

WILLIAM R. HANKS, OF NEEDHAM, ASSIGNOR TO FREDERICK A. BROWN, OF NEWTON, MASSACHUSETTS.

IMPROVEMENT IN VAPOR-BURNERS.

Specification forming part of Letters Patent No. 206,015, dated July 16, 1878; application filed January 9, 1878.

*To all whom it may concern:*

Be it known that I, WILLIAM R. HANKS, of Needham, in the county of Norfolk and State of Massachusetts, have invented a new and useful Improvement in Vapor-Burners, of which the following, when taken in connection with the accompanying drawings, is a full, clear, and exact specification.

This invention relates particularly to the water-trap intended to catch and retain any water or other foreign substance contained in or mixed with the gasoline, and to hold it subject to removal at the proper time. The water-trap now in use has the cock upon one side thereof, between the trap and the burner, and is provided with a small opening at the bottom, by means of which the water and deposit are removed.

In my invention, I place the cock immediately over the trap, thus saving expense and preventing danger from leakage between the pipe over the trap and the cock. I also provide a large opening by means of which the water and deposit may be much more thoroughly and easily removed than in the one now in use.

Figure 1:
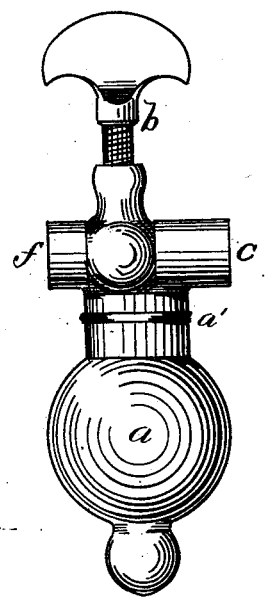
Figure 2:
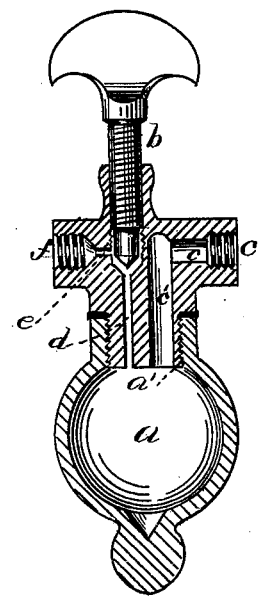

In the accompanying drawings, Figure 1 is an elevation of my trap and cock. Fig. 2 is a vertical section of the same.

Similar letters of reference indicate corresponding parts.

$a$ is the trap, closed at the bottom, and provided with a large mouth at $a'$, where it screws and unscrews. $b$ is the cock, placed directly over the trap $a$, thus preventing leakage, and obviating any necessity for washers.

The gasoline enters through the feed-tube $c$, and passes down through the tube $c'$ into the trap $a$. After depositing the water and other heavy matter in the bottom of the trap, the gasoline passes up the tube $d$ and through the short tube $e$ into the gas-tube $f$. At stated intervals the trap is removed, and the contents emptied through its mouth $a'$. Thus a water-trap is applied under the cock at a much less expense than is now common, and the small opening and screw-plug at the bottom of the trap are dispensed with, a wide mouth being provided in place thereof, which cannot become stopped.

Having thus fully described my invention, what I claim, and desire to secure by Letters Patent, is—

In combination with the feed and gas tubes $c f$ and conducting-tubes $c' d e$, the water-trap $a$, provided with the mouth $a'$, arranged to unscrew, as shown, and the cock $b$, placed over said tank, all constructed and arranged substantially as and for the purposes herein set forth.

WILLIAM R. HANKS.

Witnesses:
 HENRY W. WILLIAMS,
 B. W. WILLIAMS.